United States Patent
Choi et al.

(10) Patent No.: US 11,650,223 B2
(45) Date of Patent: May 16, 2023

(54) BATTERY ELECTRODE ANALYSIS METHOD

(71) Applicant: LG Chem, Ltd., Seoul (KR)

(72) Inventors: Byung Hee Choi, Daejeon (KR); Byung Joon Chae, Daejeon (KR); Jung Hoon Han, Daejeon (KR); Ji Yeon Byeon, Daejeon (KR)

(73) Assignee: LG Energy Solution, Ltd.

( * ) Notice: Subject to any disclaimer, the term of this patent is extended or adjusted under 35 U.S.C. 154(b) by 364 days.

(21) Appl. No.: 15/734,784

(22) PCT Filed: Oct. 15, 2019

(86) PCT No.: PCT/KR2019/013507
§ 371 (c)(1),
(2) Date: Dec. 3, 2020

(87) PCT Pub. No.: WO2020/080793
PCT Pub. Date: Apr. 23, 2020

(65) Prior Publication Data
US 2021/0231704 A1    Jul. 29, 2021

(30) Foreign Application Priority Data
Oct. 19, 2018    (KR) .......................... 10-2018-0125480

(51) Int. Cl.
*G01Q 30/04*    (2010.01)
*G01Q 30/20*    (2010.01)
(Continued)

(52) U.S. Cl.
CPC ............. *G01Q 30/04* (2013.01); *G01Q 30/20* (2013.01); *G06T 5/50* (2013.01); *G06T 7/0004* (2013.01);
(Continued)

(58) Field of Classification Search
CPC .......... G01Q 30/04; G01Q 30/20; G06T 5/50; G06T 7/004; G06T 2207/20221; G06T 2207/30108; H01M 4/13; H01M 10/4285
See application file for complete search history.

(56) References Cited

U.S. PATENT DOCUMENTS

2005/0237410 A1    10/2005    Shiohara
2010/0069717 A1*    3/2010    Hafezi .................. A61M 31/00
                                                                600/117
(Continued)

FOREIGN PATENT DOCUMENTS

JP    2005295497 A    10/2005
JP    2007123207 A    5/2007
(Continued)

OTHER PUBLICATIONS

International Search Report for PCT/KR2019/013507 dated Feb. 4, 2020; 3 pages.

*Primary Examiner* — Nicole M Ippolito
(74) *Attorney, Agent, or Firm* — Lerner David LLP

(57) ABSTRACT

The present disclosure relates to a method for analyzing an electrode for a battery, which has the advantage of being capable of more easily distinguishing between the constituent materials of the electrode such as the electrode active material, the conductive material, and the pores, by using scanning spreading resistance microscopy.

6 Claims, 3 Drawing Sheets

(51) Int. Cl.
  *G06T 5/50* (2006.01)
  *G06T 7/00* (2017.01)
  *H01M 4/13* (2010.01)
  *H01M 10/42* (2006.01)

(52) U.S. Cl.
  CPC ......... *H01M 4/13* (2013.01); *H01M 10/4285* (2013.01); *G06T 2207/20221* (2013.01); *G06T 2207/30108* (2013.01)

(56) References Cited

U.S. PATENT DOCUMENTS

| | | |
|---|---|---|
| 2014/0304862 A1 | 10/2014 | Matsubara |
| 2017/0358825 A1* | 12/2017 | Yoshima ........... H01M 10/0585 |
| 2018/0083269 A1 | 3/2018 | Iwasaki et al. |
| 2018/0366727 A1 | 12/2018 | Toyama et al. |
| 2020/0075937 A1 | 3/2020 | Konishi et al. |
| 2021/0316815 A1* | 10/2021 | Konrad ................... B60T 11/22 |

FOREIGN PATENT DOCUMENTS

| | | |
|---|---|---|
| JP | 2014203665 A | 10/2014 |
| JP | 2015041434 A | 3/2015 |
| JP | 2018163871 A | 10/2018 |
| KR | 20160149450 A | 12/2016 |
| KR | 101699809 B1 | 1/2017 |
| KR | 20170006663 A | 1/2017 |
| KR | 20180005060 A | 1/2018 |
| KR | 20180031549 A | 3/2018 |
| KR | 20180069908 A | 6/2018 |
| WO | 2018168059 A1 | 9/2018 |

* cited by examiner

[Fig.1]
(a)
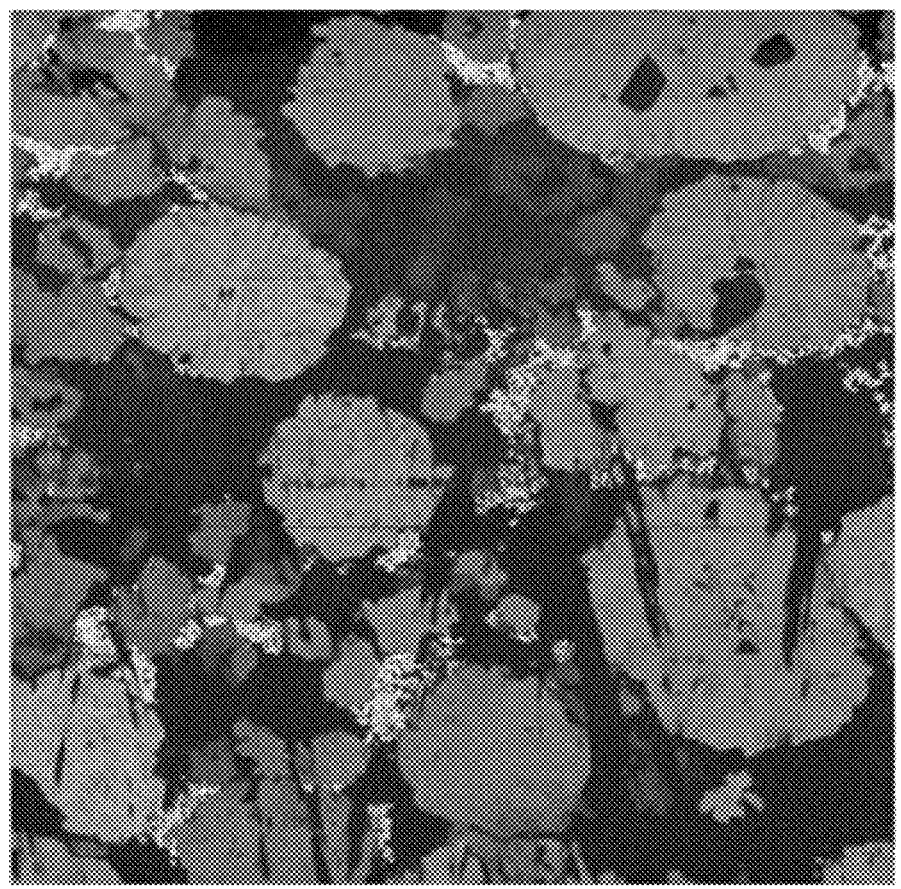
(b)
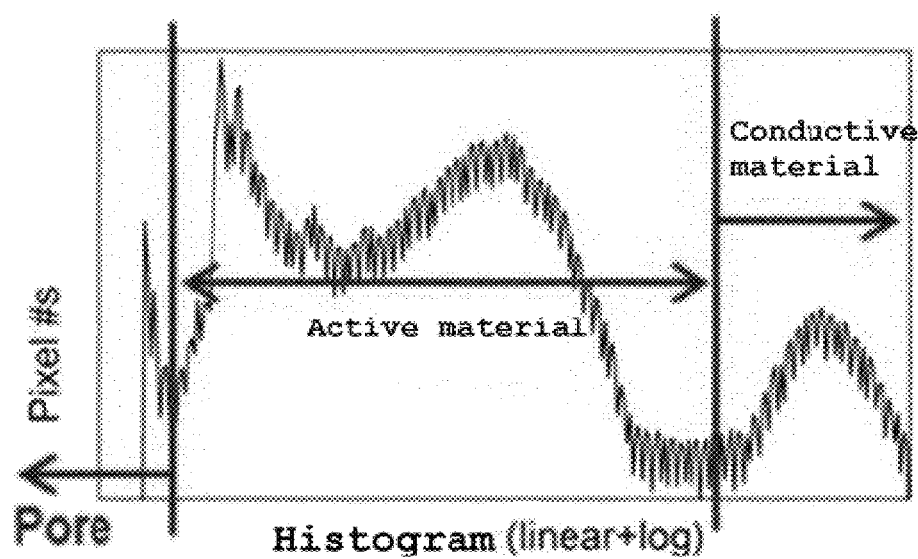

[Fig.2]
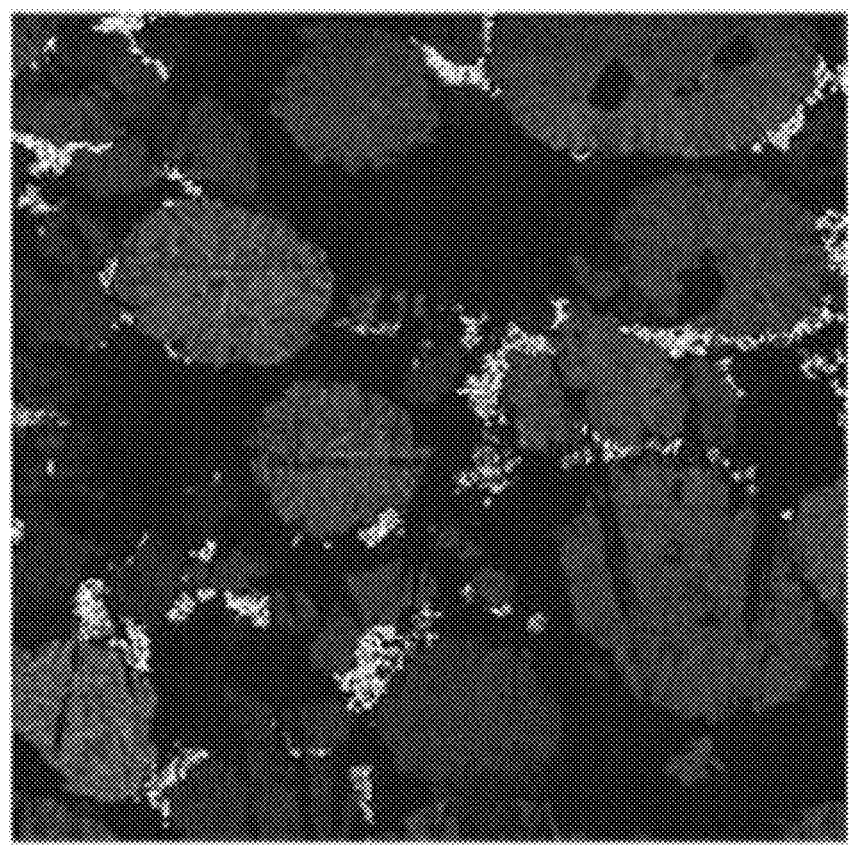
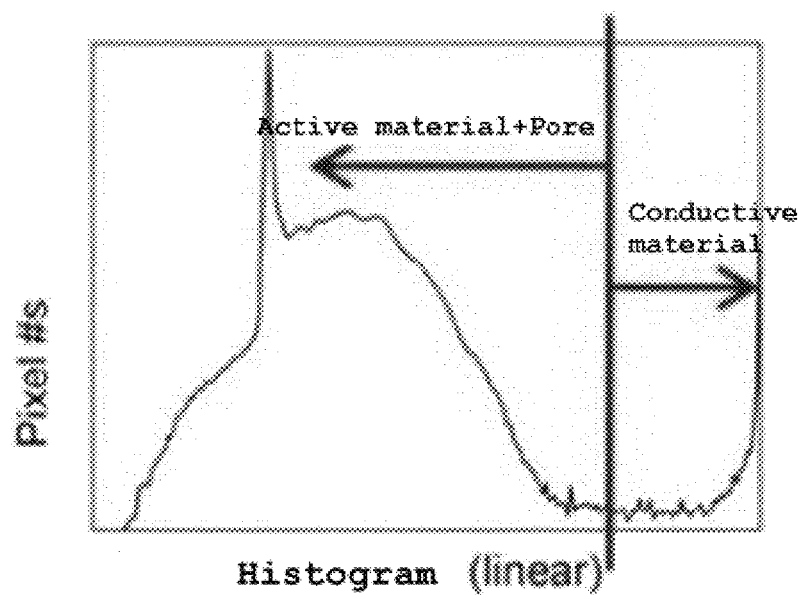

[Fig. 3]
(a)
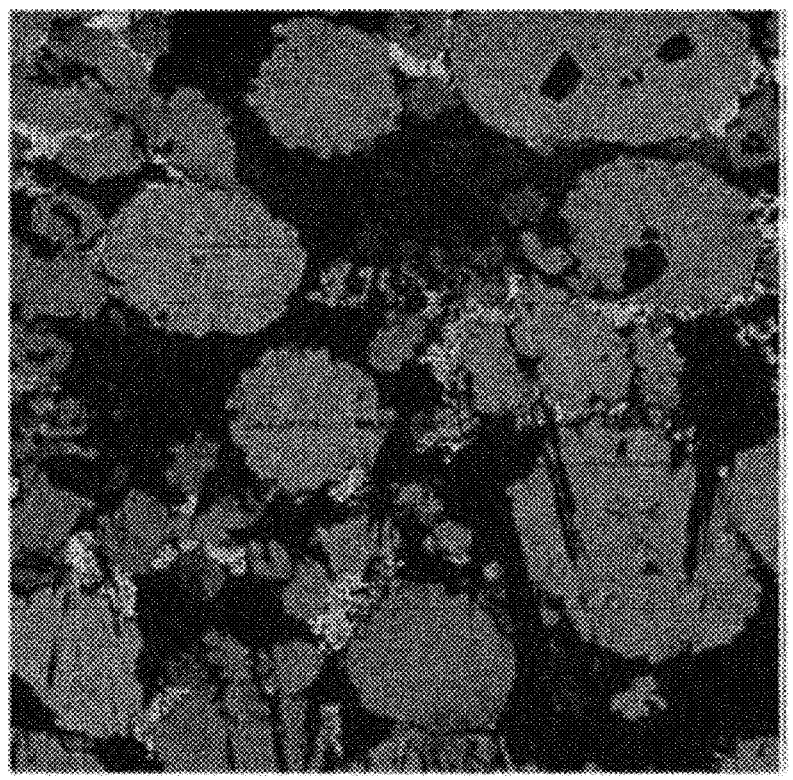
(b)
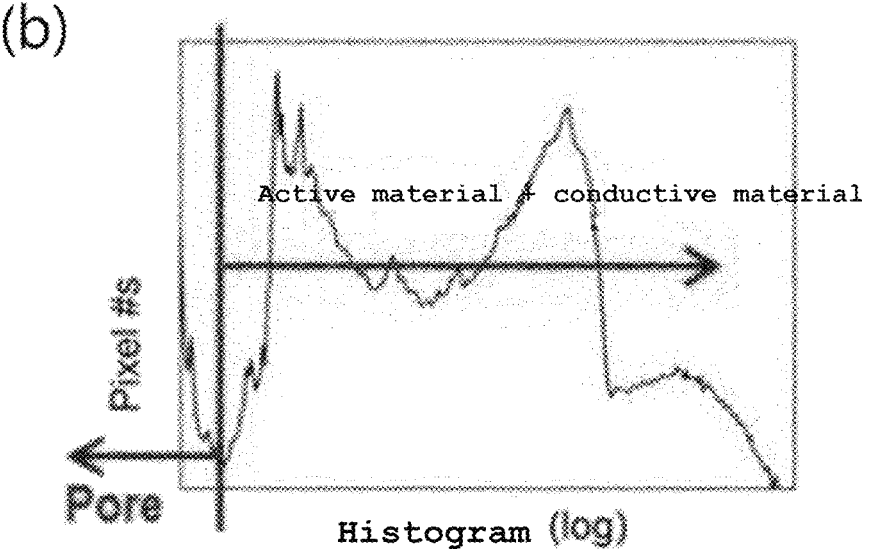

BATTERY ELECTRODE ANALYSIS METHOD

CROSS-REFERENCE TO RELATED APPLICATIONS

The present application is a national phase entry under 35 U.S.C. § 371 of International Application No. PCT/KR2019/013507, filed on Oct. 15, 2019, which claims priority to Korean Patent Application No. 10-2018-0125480 filed on Oct. 19, 2018, the disclosures of which are incorporated herein by reference.

TECHNICAL FIELD

The present disclosure relates to a method for analyzing an electrode for a battery.

BACKGROUND ART

A secondary battery is generally composed of electrodes, a separator and an electrolyte, and the electrodes are classified into a negative electrode and a positive electrode. In the electrodes, constituent materials, including an active material, a conductive material and a binder, are three-dimensionally distributed, and thus many pores exist in the gaps therebetween. In order to improve the performance of the electrodes, it is very important to quantify and analyze the distribution of the constituent materials of the electrodes.

In particular, since the conductive material may be easily distinguished only by its conductivity from the constituent materials of the electrodes, a quantification analysis method using scanning spreading resistance microscopy (SSRM) is used to distinguish the conductive material from the others.

However, since the magnitude distribution of the resistance values of the constituent materials of the electrodes is very broad, a problem arises in that it is difficult to accurately distinguish the regions of the electrode constituent materials, such as the conductive material, the active material and the pores, from the data obtained by the SSRM of cross-sections of the electrodes.

Accordingly, there is a need for a technology capable of more easily distinguishing between the constituent materials of the electrodes by the SSRM.

DISCLOSURE

Technical Problem

The present disclosure intends to provide a method for analyzing an electrode for a battery, which is capable of more easily distinguishing the constituent materials of the electrode by scanning spreading resistance microscopy (SSRM).

However, problems to be solved by the present disclosure are not limited to the above-mentioned problem, and other problems which are not mentioned will be clearly understood by those skilled in the art from the following description.

Technical Solution

One embodiment of the present disclosure provides a method for analyzing an electrode for a battery, the method including the steps of: preparing an electrode for a secondary battery including an electrode active material, a conductive material, and pores; preparing an electrode cross-section sample by irradiating the electrode for a secondary battery with an ion beam from an ion milling apparatus; obtaining resistance value data of the electrode active material, conductive material and pores of the electrode cross-section sample by scanning spreading resistance microscopy; obtaining a logarithmic scale image by changing the resistance value data to a logarithmic scale; obtaining a linear scale image by changing the resistance value data to a linear scale; and obtaining a merged image by merging the logarithmic scale image with the linear scale image.

Advantageous Effects

The method for analyzing an electrode for a battery according to one embodiment of the present disclosure has an advantage in that it is possible to easily distinguish between the constituent materials of the electrode, such as an electrode active material, a conductive material, and pores, by scanning spreading resistance microscopy.

The effects of the present disclosure are not limited to the above-described effect, and effects which are not mentioned will be clearly understood by those skilled in the art from the present specification and the accompanying drawings.

BRIEF DESCRIPTION OF DRAWINGS

FIG. 1 shows a merged image according to Example 1 of the present disclosure and a histogram obtained from the merged image.

FIG. 2 shows a linear scale image according to Comparative Example 1 and a histogram obtained from the linear scale image.

FIG. 3 shows a logarithmic scale image according to Comparative Example 2 and a histogram obtained from the logarithmic scale image.

BEST MODE

Throughout the present specification, it is to be understood that when any part is referred to as "including" any component, it does not exclude other components, but may further include other components, unless otherwise specified.

Throughout the present specification, when any member is referred to as being "on" another member, it refers to not only a case where any member is in contact with another member, but also a case where a third member exists between the two members.

As used in the present specification, the term "step of doing . . . " or "step of . . . " does not mean "a step for . . . ".

The present inventors have found that the magnitude of current values calculated using resistance values from the resistance value data of the electrode cross-section, obtained by scanning spreading resistance microscopy, has a distribution of $10^6$ in the range of 10 pA to 10 µA, and when the resistance value data is displayed as an image, the scale of each pixel is displayed in 256 steps, and thus the distribution of the resistance values is displayed more compactly than the actual distribution, and different images are obtained depending on which of linear scale and logarithmic scale is used. Accordingly, there was difficulty in distinguishing between the regions of the constituent materials of the electrode by the magnitude of the resistance values.

Specifically, it has been found that when the resistance values are changed to a linear scale and expressed as an image, the conductive material is easy to distinguish because a region (0.1 μA or more) clearly distinguished from the electrode active material or the pores exists in the image, but it is difficult to clearly distinguish the regions of the electrode active material and the pores. In addition, it has been found that when the resistance values are changed to a logarithmic scale and expressed as an image, the pores are easy to distinguish because a clearly distinguished region (0.1 μA or less) exists in the image, it is difficult to clearly distinguish the regions of the electrode material and the conductive material.

Accordingly, the present inventors have found that when a logarithmic scale image obtained by changing resistance value data to a logarithmic scale is merged with a linear scale image obtained by changing the resistance value data to a linear scale and the resulting merged image is analyzed, the regions of the electrode active material, conductive materials and pores included in the electrode may be easily distinguished from one another, thereby completing the present disclosure as described below.

Hereinafter, the present disclosure will be described in more detail.

One embodiment of the present disclosure provides a method for analyzing an electrode for a battery, the method including the steps of: preparing an electrode for a secondary battery including an electrode active material, a conductive material, and pores; preparing an electrode cross-section sample by irradiating the electrode for a secondary battery with an ion beam from an ion milling apparatus; obtaining resistance value data of the electrode active material, conductive material and pores of the electrode cross-section sample by scanning spreading resistance microscopy; obtaining a logarithmic scale image by changing the resistance value data to a logarithmic scale; obtaining a linear scale image by changing the resistance value data to a linear scale; and obtaining a merged image by merging the logarithmic scale image with the linear scale image.

The method for analyzing an electrode for a battery according to one embodiment of the present disclosure has an advantage in that it is capable of easily distinguishing between the constituent materials of the electrode, such as an electrode active material, a conductive material, and pores, by scanning spreading resistance microscopy.

The method for analyzing an electrode for a battery according to one embodiment of the present disclosure may be for analyzing an electrode for a secondary battery. Specifically, the method for analyzing an electrode for a battery may be for analyzing a positive electrode for a secondary battery.

According to one embodiment of the present disclosure, the electrode for a secondary battery includes an electrode active material, a conductive material, and pores. In addition, the electrode for a secondary battery may further include various additives such as a binder, which may improve the performance of the electrode. The electrode active material, the binder, the conductive material and the like are three-dimensionally distributed in the electrode for a secondary battery, and a large number of pores may exist in the gaps therebetween. That is, the constituent materials of the electrode, such as an electrode active material, a binder and a conductive material, as well as a large number of pores, may constitute the electrode for a secondary battery.

As the electrode active material, the binder and the conductive material, which are included in the electrode for a secondary battery, materials that are commonly used in the art may be selected and used without particular limitation. Specifically, if the electrode for a secondary battery is a negative electrode, carboxymethyl cellulose (CMC), a diene-based binder such as butadiene, an acrylic-based binder, or the like may be used as the binder. In addition, as the negative electrode active material, there may be used various types of carbon-based materials including artificial graphite, natural graphite or hard carbon, non-carbon based materials containing silicon (Si), lithium titanium oxide (LTO), or the like, which can intercalate and deintercalate lithium.

The method for analyzing an electrode for a battery according to one embodiment of the present disclosure may further include, before the step of preparing the electrode cross-section sample, a step of filling the pores in the electrode for a secondary battery with an epoxy group-containing polymer by impregnating the electrode for a secondary battery with the epoxy group-containing polymer.

Specifically, the step of filling the pores in the electrode for a secondary battery with the epoxy group-containing polymer may include allowing the epoxy group-containing polymer to penetrate into the pores of the electrode for a secondary battery by impregnating the electrode for a secondary battery with the epoxy group-containing polymer. As the epoxy group-containing polymer, a liquid state polymer may be used. Using the epoxy group-containing liquid state polymer, the pores of the electrode for a secondary battery may be more effectively filled with the epoxy group-containing polymer. The process of impregnating the pores of the electrode for a secondary battery with the epoxy group-containing polymer may be carried out by a conventional method known in the art. For example, through a method of applying the epoxy group-containing polymer onto the electrode for a secondary battery or immersing the electrode for a secondary battery in a solution of the epoxy group-containing polymer, the pores of the electrode for a secondary battery may be impregnated with the epoxy group-containing polymer.

According to one embodiment of the present disclosure, the method for analyzing the electrode for a battery may further include a step of measuring the resistance value of the epoxy group-containing polymer filling the pores of the electrode cross-section sample. As the pores in the electrode for a secondary battery are filled with the epoxy group-containing polymer, the resistance value of the pores in the electrode cross-section sample may be obtained by scanning spreading resistance microscopy. Specifically, resistance value data may be obtained by measuring the resistance value of the polymer material filling the pores. Through this, it is possible to identify the region where the pores are located, and it is possible to more accurately distinguish between the electrode active material region, the conductive material region and the pore region in the electrode cross-section sample from the merged image.

According to one embodiment of the present disclosure, the epoxy group-containing polymer may be an epoxy group-containing polymer which is produced by a known method or commercially available. For example, the epoxy group-containing polymer may include at least one of epoxyethane(ethylene oxide), 1,3-epoxypropane(trimethylene oxide) and bisphenol-A-epichlorohydrin, but the kind of the epoxy group-containing polymer is not limited thereto. In addition, the epoxy group-containing polymer may have a weight-average molecular weight of 700 g/mol or less. Furthermore, a solution of the epoxy group-containing polymer may be used to fill the pores in the electrode for a secondary battery, and the solution of the epoxy group-containing polymer may include a curing agent in addition to the epoxy group-containing polymer.

In addition, as the epoxy group-containing polymer, a polymer having two or more epoxy groups may be used. The epoxy group-containing polymer having two or more epoxy groups is a compound having two or more epoxy groups in the molecule. As the epoxy group-containing polymer, an aromatic or aliphatic epoxy group-containing polymer or a linear or branched epoxy group-containing polymer may be used. For example, an epoxy resin polymer including a cyclic structure in the molecular structure may be used. Specifically, an epoxy resin polymer including an aromatic group (e.g., a phenyl group) may be used. A specific example of the epoxy group-containing polymer including an aromatic group may be one or a mixture of two or more selected from among biphenyl-type epoxy group-containing polymers, dicyclopentadiene-type epoxy group-containing polymers, naphthalene-type epoxy group-containing polymers, dicyclopentadiene-modified phenol-type epoxy group-containing polymers, cresol-based epoxy group-containing polymers, bisphenol-based epoxy group-containing polymers, xyloxy-based epoxy group-containing polymers, polyfunctional epoxy group-containing polymers, phenol novolak epoxy group-containing polymers, triphenolmethane type epoxy group-containing polymers, and alkyl-modified triphenolmethane epoxy group-containing polymers, but is not limited thereto.

According to one embodiment of the present disclosure, the electrode materials may be sputtered by irradiating the electrode for a secondary battery with an ion beam generated in an ion gun of an ion milling apparatus. Through this, it is possible to prepare an electrode cross-section sample having a clean cross-section without physical damage. As the electrode cross-section sample has a clean cross-section without physical damage, the pores, the electrode active material and the binder in the electrode for a secondary battery may be more clearly distinguished from one another.

According to one embodiment of the present disclosure, the ion beam may be an argon ion beam. As the electrode for a secondary battery is irradiated with the argon ion beam, the electrode cross-section sample may be more stably prepared.

According to one embodiment of the present disclosure, the ion beam current of the ion milling apparatus may be 100 µA to 250 µA. Specifically, the ion beam current of the ion milling apparatus may be 110 µA to 150 µA, or 200 µA to 230 µA. As the ion beam current of the ion milling apparatus is adjusted within the above range, the preparation time of the electrode cross-section sample may be shortened, and an electrode cross-section sample having a cleaner cross-section may be prepared by preventing the electrode materials from being re-deposited on the cross-section of the sample. Through this, it is possible to more accurately calculate the coverage of the electrode active material of the electrode for a secondary battery.

According to one embodiment of the present disclosure, the discharge current of the ion milling apparatus may be 250 µA to 450 µA. Specifically, the discharge current of the ion milling apparatus may be 370 µA to 450 µA, or 400 µA to 430 µA. As the discharge current of the ion milling apparatus is adjusted within the above-described range, the operational efficiency of the ion milling apparatus may be prevented from decreasing, and the preparation time of the electrode cross-section sample may be minimized.

According to one embodiment of the present disclosure, the distribution of the resistance values of each of the electrode active material, conductive material and pores included in the electrode cross-section sample may be measured two-dimensionally by analyzing the electrode cross-section sample using scanning spreading resistance microscopy, an image may be obtained by visualizing the distribution, and resistance value data including these resistance values may be obtained.

According to one embodiment of the present disclosure, the electrode cross-section sample according to one embodiment of the present disclosure may be analyzed under the driving conditions of a scanning spreading resistance microscope for analyzing electrode cross-section samples in the art. For example, in the present disclosure, an NX-10 AFM system (Park Systems) equipped with an SSRM module may be used as the scanning spreading resistance microscope, and SmartScan (Park Systems) may be used as measurement software. As specific driving conditions, the contact mode may be set, and the image pixels to be obtained may be set to 1024×1024, the scan rate may be set to 0.2 Hz to 0.25 Hz, the bias may be set to 2.0 V or less, and the set point may be set to 1.0 V or less.

In addition, as the probes of the AFM, there may be used solid diamond AFM probes (IMEC) which each have a length of 465 µm, a width of 50 µm and a thickness of 5 µm and are made of B-doped polycrystalline diamond.

According to one embodiment of the present disclosure, the resistance value data obtained by the scanning spreading resistance microscopy may be processed and changed to a logarithmic scale to obtain a logarithmic scale image. In addition, the resistance value data obtained by the scanning spreading resistance microscopy may be processed and changed to a linear scale to obtain a linear scale image.

As described above, in the case of the logarithmic scale image, it is not easy to distinguish between the electrode active material and the conductive material, and in the case of the linear scale image, it is not easy to distinguish between the electrode active material and the pores.

However, the method for analyzing an electrode for a battery according to one embodiment of the present disclosure has an advantage in that it can more clearly distinguish between the electrode active material, the conductive material and the pores, which are included in the electrode cross-section sample, by analyzing the merged image obtained by merging the logarithmic scale image and linear scale image obtained from the resistance value data.

According to one embodiment of the present disclosure, the method for analyzing an electrode for a battery may further include a step of distinguishing between and quantifying the electrode active material region, the conductive material region and the pore region in the electrode cross-section sample by analyzing the merged image. In addition, the method for analyzing an electrode for a battery may further include a step of distinguishing between and quantifying the electrode active material region, the conductive material region, the pore region and the binder region in the electrode cross-section sample by analyzing the merged image.

According to one embodiment of the present disclosure, the step of quantifying may include a step of obtaining a histogram in which materials constituting the electrode cross-section sample are displayed separately, by analyzing the merged image. Specifically, it is possible to determine whether a region corresponding to each pixel on the obtained histogram is the electrode active material region, the conductive material region or the pore region. Using information of each pixel whose corresponding region was determined, it is possible to easily quantify the areas and distributions of the electrode active material region, the conductive material region and the pore region in the merged image.

MODE FOR INVENTION

Hereinafter, the present disclosure will be described in detail with reference to examples. However, the examples according to the present disclosure may be modified into various different forms, and the scope of the present disclosure is not interpreted as being limited to the examples described below. The examples of the present specification are provided to more completely explain the present disclosure to those skilled in the art.

Example 1

Preparation of Positive Electrode Cross-Section Sample

A positive electrode for a secondary battery (LG Chem., Ltd.) was prepared which includes a positive electrode active material (NCM622, Nichia) and a conductive material (FX35, Denka). In addition, as an epoxy group-containing polymer, a solution containing an epoxy-based polymer having a weight-average molecular weight of about 700 g/mol or less was prepared. The positive electrode for a secondary battery was immersed in the prepared epoxy-based polymer solution to fill the pores of the positive electrode for a secondary battery with the epoxy group-containing polymer. Then, the surface of the positive electrode for a secondary battery was cut off by irradiation with a focused argon (Ar) ion beam from an ion milling device (IM 4000, Hitachi) that emits an argon ion beam, thereby preparing a positive electrode cross-section sample having a clean cross-section. The argon ion beam irradiation was performed at a discharge current of 400 µA, an ion beam current of 130 µA and a gas flow rate of 1 $cm^3$/min for 3 hours.

Acquisition of Merged Image

Using a scanning spreading resistance microscope (NX-10 AFM system; Park Systems), the resistance value of the positive electrode active material, the resistance value of the conductive material and the resistance value of the epoxy group-containing polymer filling the pores were measured from the prepared positive electrode cross-section sample. At this time, as the driving conditions of the scanning spreading resistance microscope, the contact mode was set, the image pixels to be obtained were set to 1024×1024, the scan rate was set to 0.2 Hz, the bias was set to 2.0 V, and the set point was set to 1.0 V.

Thereafter, using the XEI software (Park Systems) included in the scanning spreading resistance microscope, the obtained resistance value data were changed to a logarithmic scale to obtain a logarithmic scale image, and the resistance value data were changed to a linear scale to obtain a linear scale image.

Next, using the Avizo software (FEI), the obtained logarithmic scale image and linear scale image were merged with each other to obtain a merged image, and a histogram was obtained from the merged image.

Comparative Example 1

A positive electrode cross-section sample was prepared in the same manner as Example 1 above, and resistance value data were obtained using a scanning spreading resistance microscope. Then, the obtained resistance value data were changed to a linear scale to obtain a linear scale image in the same manner as Example 1 above, and a histogram was obtained from the linear scale image.

Comparative Example 2

A positive electrode cross-section sample was prepared in the same manner as Example 1 above, and resistance value data were obtained using a scanning spreading resistance microscope. Then, the obtained resistance value data were changed to a logarithmic scale to obtain a logarithmic scale image in the same manner as Example 1 above, and a histogram was obtained from the logarithmic scale image.

FIG. 1 shows the merged image (a) according to Example 1 of the present disclosure and the histogram (b) obtained from the merged image. Furthermore, FIG. 2 shows the linear scale image (a) according to Comparative Example 1 and the histogram (b) obtained from the linear scale image. In addition, FIG. 3 shows the logarithmic scale image (a) according to Comparative Example 2 and the histogram (b) obtained from the logarithmic scale image.

Referring to FIG. 1, it was confirmed that, on the histogram obtained from the merged image obtained by merging the logarithmic scale image with the linear scale image, the pixels corresponding to the positive electrode active material, the conductive material and the pores, respectively, were clearly distinguished from one another. That is, it can be seen that the areas and distributions of the electrode active material region, the conductive material region and the pore region in the merged image can be easily quantified using information of each pixel whose corresponding region was determined.

On the contrary, referring to FIG. 2, it was confirmed that, on the histogram obtained from the linear scale image, the pixels corresponding to the positive electrode active material and the pores, respectively, were not clearly distinguished from each other. In addition, referring to FIG. 3, it was confirmed that, on the histogram obtained from the logarithmic scale image, the pixels corresponding to the positive electrode active material and the conductive material, respectively, were not clearly distinguished from each other.

That is, it can be seen that the conventional method of analyzing the electrode for a battery using only the linear scale image or the logarithmic scale image cannot accurately quantify the areas and distributions of the electrode active material region, the conductive material region and the pore region.

The invention claimed is:

1. A method for analyzing an electrode for a battery, comprising:
    preparing an electrode for a secondary battery comprising an electrode active material, a conductive material, and pores;
    preparing an electrode cross-section sample by irradiating the electrode for a secondary battery with an ion beam from an ion milling apparatus;
    obtaining resistance value data of the electrode active material, the conductive material and the pores in the electrode cross-section sample by scanning spreading resistance microscopy;
    obtaining a logarithmic scale image by changing the resistance value data to a logarithmic scale;
    obtaining a linear scale image by changing the resistance value data to a linear scale; and
    obtaining a merged image by merging the logarithmic scale image with the linear scale image.

2. The method of claim 1, further comprising distinguishing between and quantifying a region of the electrode active material, a region of the conductive material and a region of the pores in the electrode cross-section sample, by analyzing the merged image.

3. The method of claim 1, further comprising, before the preparing the electrode cross-section sample, filling pores in the electrode for a secondary battery with an epoxy group-containing polymer by impregnating the electrode for a secondary battery with the epoxy group-containing polymer.

4. The method of claim 3, further comprising measuring a resistance value of the epoxy group-containing polymer filling the pores of the electrode cross-section sample.

5. The method of claim 1, wherein the ion beam is an argon ion beam.

6. The method of claim 1, wherein an ion beam current of the ion milling apparatus is 100 μA to 250 μA.

* * * * *